(12) United States Patent
Kaushik

(10) Patent No.: US 10,037,501 B2
(45) Date of Patent: Jul. 31, 2018

(54) ENERGY MANAGEMENT COSTS FOR A DATA CENTER

(71) Applicant: International Business Machines Corporation, Armonk, NY (US)

(72) Inventor: Rini Kaushik, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 14/132,920

(22) Filed: Dec. 18, 2013

(65) Prior Publication Data

US 2015/0170080 A1   Jun. 18, 2015

(51) Int. Cl.
| | |
|---|---|
| *G06Q 10/00* | (2012.01) |
| *G06Q 20/00* | (2012.01) |
| *G06Q 10/06* | (2012.01) |
| *G06Q 50/06* | (2012.01) |

(52) U.S. Cl.
CPC ....... *G06Q 10/06312* (2013.01); *G06Q 50/06* (2013.01)

(58) Field of Classification Search
USPC .............................. 705/7.11–7.42
See application file for complete search history.

(56) References Cited

U.S. PATENT DOCUMENTS

| | | | | |
|---|---|---|---|---|
| 8,271,813 B2* | 9/2012 | Jackson | ................ | G06F 1/3203 713/300 |
| 2003/0055776 A1* | 3/2003 | Samuelson | ............ | G06Q 40/04 705/37 |
| 2010/0218108 A1* | 8/2010 | Crabtree | ................ | G06Q 50/06 715/738 |
| 2012/0180055 A1* | 7/2012 | Brech | ................... | G06F 9/4893 718/102 |
| 2012/0278503 A1 | 11/2012 | DeCusatis et al. | | |
| 2012/0296482 A1* | 11/2012 | Steven | ................... | G06Q 50/06 700/291 |
| 2013/0066480 A1 | 3/2013 | Glavic et al. | | |
| 2013/0104136 A1 | 4/2013 | Brech et al. | | |

FOREIGN PATENT DOCUMENTS

WO   2011076486 A1   6/2011

OTHER PUBLICATIONS

Goiri, et al., "GreenHadoop: Leveraging Green Energy in Data-Processing Frameworks", EuroSys'12, Apr. 10-13, 2012, Bern, Switzerland. (Year: 2012).*

(Continued)

*Primary Examiner* — Amber A Misiaszek
(74) *Attorney, Agent, or Firm* — Nathan M. Rau

(57) ABSTRACT

A method and computer program product for managing energy management costs of a data center is disclosed. The method and computer program product include computing an energy cost estimate based on available energy rates which include wholesale electricity prices for periods of time of an hour. Embodiments of the method and computer program product include establishing fees for processing jobs. The fees are based on at least one wholesale electricity price. Embodiments of the method and computer program product include processing jobs based on scheduling-factors. Example scheduling-factors include factors related to timing, duration, environment, cost, or priority.

18 Claims, 8 Drawing Sheets

(56) References Cited

OTHER PUBLICATIONS

Ifrim, G., et al., "Properties of Energy-Price Forecasts for Scheduling", CP'12 Proceedings of the 18th International Conference of Principles and Practice of Constraint Programming. Springer-Verlag Berlin, Heidelberg © 2012. DOI : 10.1007/978-3-642-33558-7 68.
Kaushik, R., et al., "Greening the Compute Cloud's Pricing Plans," HotPower'13, Nov. 3-6, 2013, Farmington, PA, USA Copyright 2013 ACM 978-1-4503-2458-8/13/11. Grace Period Disclosure. http://dx.doi.org/10.1145/2525526.2525855.
Le, K., et al., "Reducing Electricity Cost Through Virtual Machine Placement in High Performance Computing Clouds", SC '11 Proceedings of 2011 International Conference for High Performance Computing, Networking, Storage and Analysis, Nov. 12-18, 2011. ACM New York, NY, USA © 2011. DOI : 10.1145/2063384.2063413.
Luo, J., et al., "eco-IDC: Trade Delay for Energy Cost with Service Delay Guarantee for Internet Data Centers" IEEE International Conference on Cluster Computing, Sep. 24-28, 2012. pp. 45-53. © 2012 IEEE DOI : 10.1109/CLUSTER.2012.23.
"Amazon EC2," https://aws.amazon.com/ec2/, printed: Dec. 8, 2017, pp. 1-11.
"IBM Cloud pricing," https://www.ibm.com/cloud/pricing, printed: Dec. 8, 2017, pp. 1-4.
"Rackspace," https://www.rackspace.com/, printed: Dec. 8, 2017, pp. 1-6.

\* cited by examiner

ENERGY MANAGEMENT COSTS FOR A DATA CENTER

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURE(S): Rini T Kaushik, Prasenjit Sarkar, and Abdullah Gharaibeh; Greening the Compute Cloud's Pricing Plans; In Proceedings of the International Conference on Power Aware Computing and Systems, HotPower, 2013, USENIX Association; initially submitted for review to the HotPower conference on Jul. 29, 2013, and presented by Rini T Kaushik in the conference on Nov. 3, 2013.

BACKGROUND

This disclosure relates generally to computer systems and, more particularly, relates to energy management costs for a data center. The amount of data that needs to be managed by enterprises is growing at an extremely high rate. The public cloud services market has grown over time. Cloud services can assist in managing data. Energy costs directly impact cost of ownership of a data center related to a cloud offering. Data center management affects both the owners and customers of cloud services.

BRIEF SUMMARY

Aspects of the disclosure include a method and computer program product for managing energy management costs of a data center. The method and computer program product include computing an energy cost estimate based on available energy rates which include wholesale electricity prices for periods of time of an hour. Embodiments of the method and computer program product include establishing fees for processing jobs. The fees are based on at least one wholesale electricity price. Embodiments of the method and computer program product include processing jobs based on scheduling-factors.

Aspects of the disclosure compute or ascertain wholesale electricity prices for the data center. The wholesale electricity prices may vary over a period of time related to hours. Aspects of the disclosure include scheduling, processing, interrupting, and restarting jobs by considering multiple scheduling factors such as a temporal rating, a duration rating, an environmental rating, a cost rating, or a priority rating. The scheduling method may improve the utilization, lessen the waiting time, and lessen the time difference between the start and finish of a sequence of jobs. The scheduling method may reduce energy costs, and can have an awareness of fine-grained, hourly variations in the wholesale electricity day-ahead prices. The scheduling method may reduce energy costs while maintaining that high priority jobs are not delayed.

Aspects of the disclosure may positively impact energy costs. Fine-grained wholesale electricity prices may be lower than the retail prices for a significant amount of time for the purposes of scheduling and/or processing jobs. In particular, aspects may be utilized for non-interactive, non-critical batch jobs because such jobs may be scheduled during periods when energy rates are lower. Aspects of the disclosure may provide users an option to specify their temporal targets and priorities. In addition, aspects can present users with lower prices if they were to opt for flexible deadlines and priorities.

DETAILED DESCRIPTION

Figure 1A:
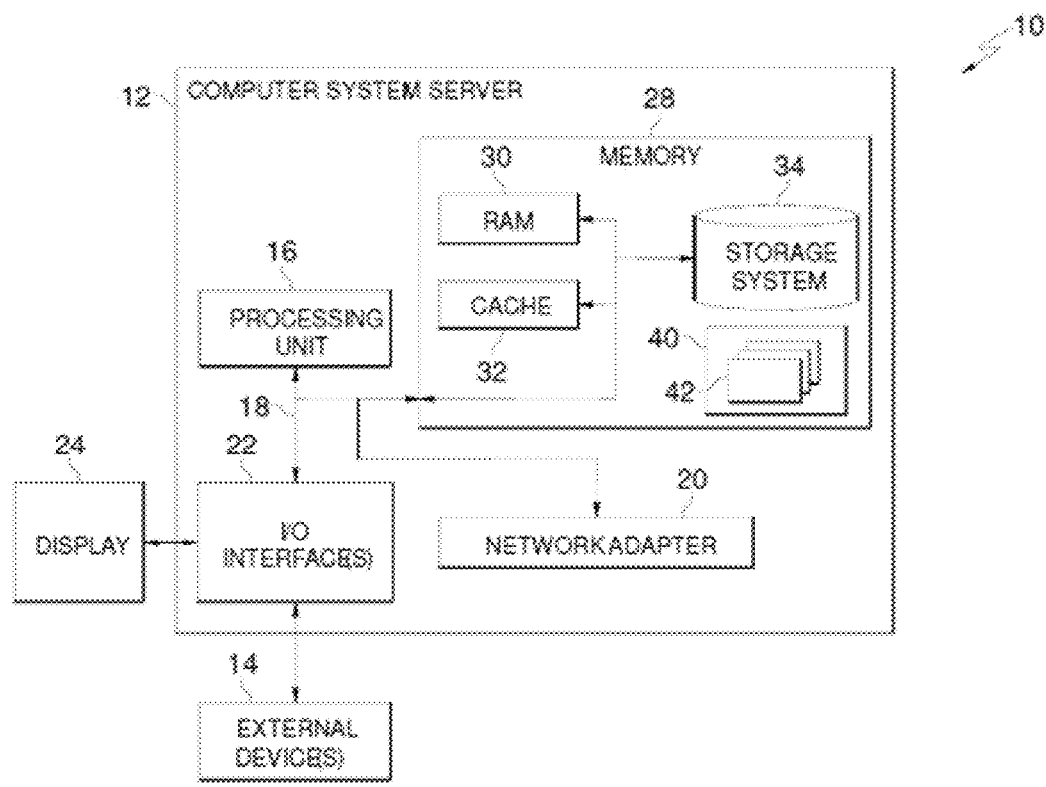
FIG. 1A depicts a cloud computing node according to embodiments.

Aspects of the disclosure relate to synergistic energy-aware management of a data center associated with a cloud computing environment. Aspects of the disclosure may have a positive impact on energy costs (e.g., demand charges) by leveraging fine-grained temporal variations in wholesale electricity rates. Significant, fine-grained variations in wholesale electricity rates may be leveraged in association with differences in temporal deadlines, execution time, and priorities of incoming jobs to put into place electricity rate aware fine-grained job scheduling. Jobs with flexible (lax, less stringent) temporal targets (deadlines) and relatively lower ranking priorities may be scheduled during intervals of low day-ahead electricity rates in a way that does not violate their deadlines. Differentiated cloud pricing plans may be provided to users to present incentives (e.g., lower charge-backs) to accurately characterize their job characteristics (e.g., expected deadline tolerance, start-time delay tolerance, or expected job run-time) at the time of job submission to aid job scheduling, or to opt for computing at times when renewable energy sources are available.

Aspects of the disclosure leverage the knowledge that some of the most common jobs that are frequently offloaded to the cloud do not generally have strict deadlines or priority. Some examples of such jobs are: 1) optional but desirable simulation runs to increase confidence level of the experimenter, 2) video encoding, compression, and trans-coding, 3) complex model generation, 4) genomics analytics, 5) long running drug testing, analysis, and design, 6) geo-spatial and physics simulations, 7) off-line predictive analytics and model generation for website analytics, trend analytics, and user behavior and desires profiling, 8) scalable application testbed and for doing more testing runs for thorough quality assurance, and 9) document conversion. Such jobs are typically long-running and hence, can result in high usage costs. Submitters of such jobs can take advantage of the lower usage costs incentive provided by the proposed pricing plan by assigning a delayed start-time or flexible (lax) deadline to their jobs, which helps scheduler delay, stagger, or interrupt and restart such jobs to reduce energy costs, demand charges and charge-backs.

Aspects of the disclosure present a synergistic cloud where a pricing plan, a job scheduling method, and a charge-back model can work in tandem with each other to provide green and cost-efficient computing options and incentives to the environmentally-friendly and cost-conscious users. The fine-grained, wholesale electricity price aware scheduling method may work in synergy with choices of users to reduce operating energy costs. The fine-grained, resource-utilization based, and spot price aware charge-back model can be used to provide incentives in the form of reduced cloud usage costs.

Cloud service providers charge users for using their services. The offered pricing plans can be dependent on the operational and capital costs incurred by the providers. Given the plethora of cloud providers in the market, attractive pricing plans are one of the key determinants in the adoption rate of a cloud provider by a user. A way to reduce energy costs in a single-site cloud is to leverage temporal differences in electricity rates to schedule low priority jobs during low electricity rate intervals. Such a staggering of jobs may reduce the peak load resulting in a reduction in demand charges. In a wholesale electricity market, competing generators may sell their output to day-ahead and real-time wholesale spot markets or directly to retail users. A fine-grained scheduling method based on fine-grained wholesale electricity-prices which may exhibit significant temporal variations in rates during the day, may have positive effects (e.g., reduction in energy costs without violating temporal deadline targets) relative to a coarse-grained scheduling method based on coarse-grained, on/off-peak prices.

For a cloud scheduling method to be effective, knowing the priorities and deadline tolerances of jobs to be performed may be useful. Creating predictive models to characterize job characteristics based on off-line analysis may be challenging due to potential unpredictability in workloads on the cloud. In addition, users may be more likely to specify job priorities or tolerances if associated incentives exist. Thus, a synergy/teaming of efforts between the users and the cloud may be beneficial. Therefore, aspects of the disclosure may provide incentives (e.g., lower usage costs, green computing) to users. A charge-back model that uses the actual resource utilization of individual machines (e.g., virtual machines) running on behalf of the user and the associated dynamic wholesale spot electricity price in that interval to calculate the usage costs may assist in providing incentives. Such a fine-grained model (e.g., based on hours or minutes) may be able to reflect the benefits of the energy-aware scheduling by positively impacting usage costs for the users. This is in contrast to charge-back calculation models that are much more coarse-grained (e.g., based on on/off peak) that may use the entire duration a job under a configuration to run at constant peak electricity rates. Such models may be impervious to positive impacts of energy-rate aware scheduling and temporal variations in the electricity rates.

Aspects of the disclosure include a method for managing a data center. The method computes or ascertains (determines, finds out) day-ahead and real-time wholesale electricity prices for the data center. The wholesale electricity prices may exhibit temporal variations. Such temporal variations may occur, for example, at the granularity of five-minutes, fifteen-minutes, or an hour. In embodiments, an amount of electricity used by the various jobs in the data center may be measured. The data center may receive a number of jobs from a number of users.

Aspects of the disclosure include scheduling, processing, interrupting, and restarting jobs by considering multiple scheduling factors such as a temporal rating (e.g, a ranking for completion time or deadline), a duration rating (e.g., a classification for job-length), an environmental rating (e.g., a grade for wind or solar energy friendliness), a cost rating (e.g., a scoring system for fees or prices), or a priority rating (e.g., a categorization based on comparing jobs). For example, the environmental rating can be based on a price of petroleum energy (e.g., a current market price for Texas light sweet crude oil), a price of wind energy, a price of solar energy, and a price of corn used for ethanol (e.g., a current market price for corn futures in Chicago).

The scheduling method may improve the utilization, lessen the waiting time, and lessen the time difference between the start and finish of a sequence of jobs. The scheduling method may reduce energy costs, and can have an awareness of fine-grained, hourly variations in the wholesale electricity day-ahead prices. The scheduling method may reduce energy costs while maintaining that high priority jobs are not delayed (e.g., due to operations of the scheduling method), the start-time of low priority jobs may not be delayed more than a "look-ahead window" of hours or a desired start-time (if specified) by a user, and a run-time of low priority jobs may not exceed their specified deadline tolerance.

Aspects of the disclosure include computing or ascertaining renewable resource rates (e.g., a rate for green energy resources such as wind or solar) for the data center if the data center has access to renewable energy sources. The pricing plan allows the user to choose a start-time which coincides with high availability of renewable energy. This option may appeal to environmentally conscious persons. In embodiments, a different pricing plan and fee structure may be used for the renewable energy usage. A first renewable resource rate for the first period of time of the first hour and a second renewable resource rate for the second period of time of the second hour may be computed or ascertained. The first renewable resource rate can be different from the second renewable resource rate. The fees, including the first fee, can be established based at least in part on at least one of the first and second renewable resource rates. In embodiments, the fees may be calculated using one or more of the wholesale electricity prices and an actual resource utilization of a machine (e.g., virtual machine) running on behalf of a user for one or more of the periods of time. A particular fee may be less than a retail fee (e.g., a retail electricity price for a particular period of time) for at least beginning processing of a specific job before a specific temporal target.

Aspects of the disclosure may positively impact (e.g., lower) energy costs. Fine-grained wholesale electricity prices may be lower than the retail prices for a significant amount of time for the purposes of scheduling and/or processing jobs. In particular, aspects may be utilized for non-interactive, non-critical batch jobs because such jobs may be scheduled during periods when energy rates are lower. Energy-aware scheduling and temporal job staggering as described can positively impact the peak demand and also positively impact demand charges related to electricity. Staggering the execution of the jobs leaves more resources available for high priority jobs, providing potentially positive performance results. Leveraging fine-grained variations in the wholesale prices may produce fewer deadline violations. Schedule staggering can occur during the day as opposed to waiting until the night to schedule jobs as might be done in coarse-grained off/on-peak scheduling.

Aspects of the disclosure may provide users an option to specify their temporal targets (deadlines) and priorities. In addition, aspects can present users with lower prices if they were to opt for flexible deadlines and priorities. Such aspects may give users incentive to be more precise or accurate regarding their jobs specifications. Features may operate independent of multi-data center support and application level changes may be avoided. Time spreading of jobs may positively impact energy requirements related to cooling, thereby assisting with overall energy costs.

It is understood in advance that although this disclosure includes a detailed description regarding cloud computing, implementation of the teachings recited herein are not limited to a cloud computing environment. Rather, embodiments of the disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1A, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
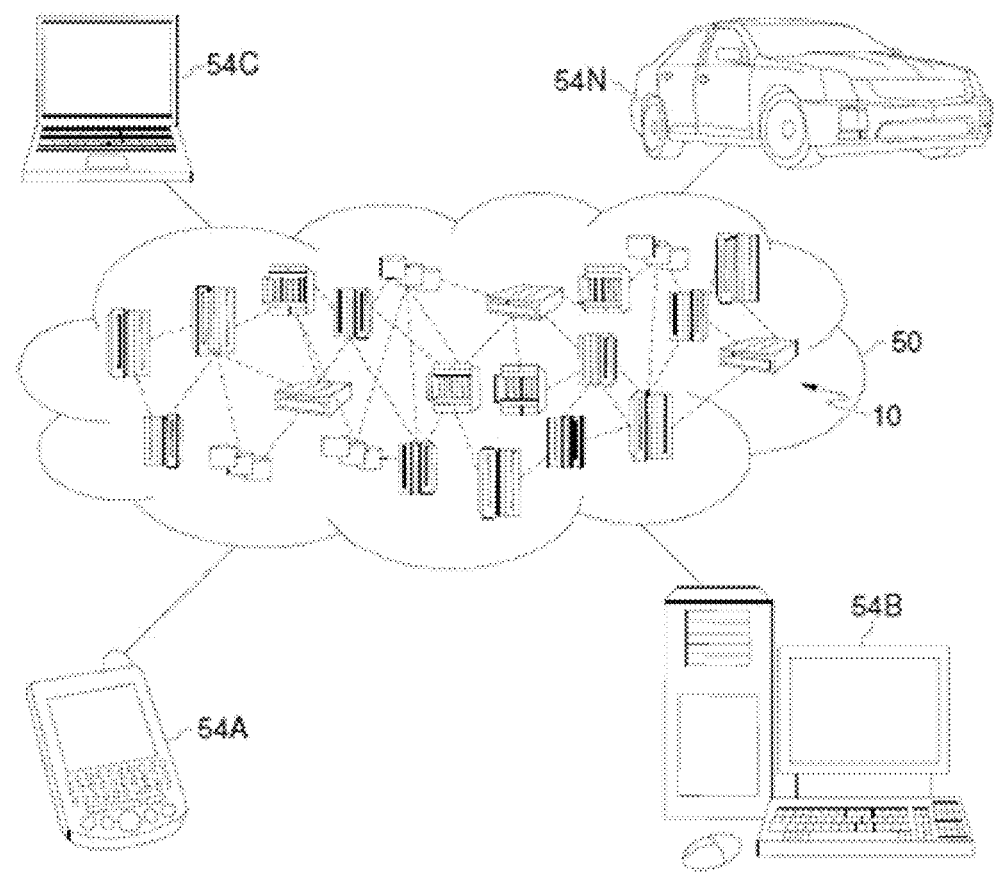
FIG. 1B depicts a cloud computing environment according to embodiments.

Referring now to FIG. 1B, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1B are intended to be illustrative only and that computing nodes 10 and cloud computing environment 50 can communicate with any type of computerized device over any type of network and/or network addressable connection (e.g., using a web browser).

Figure 1C:
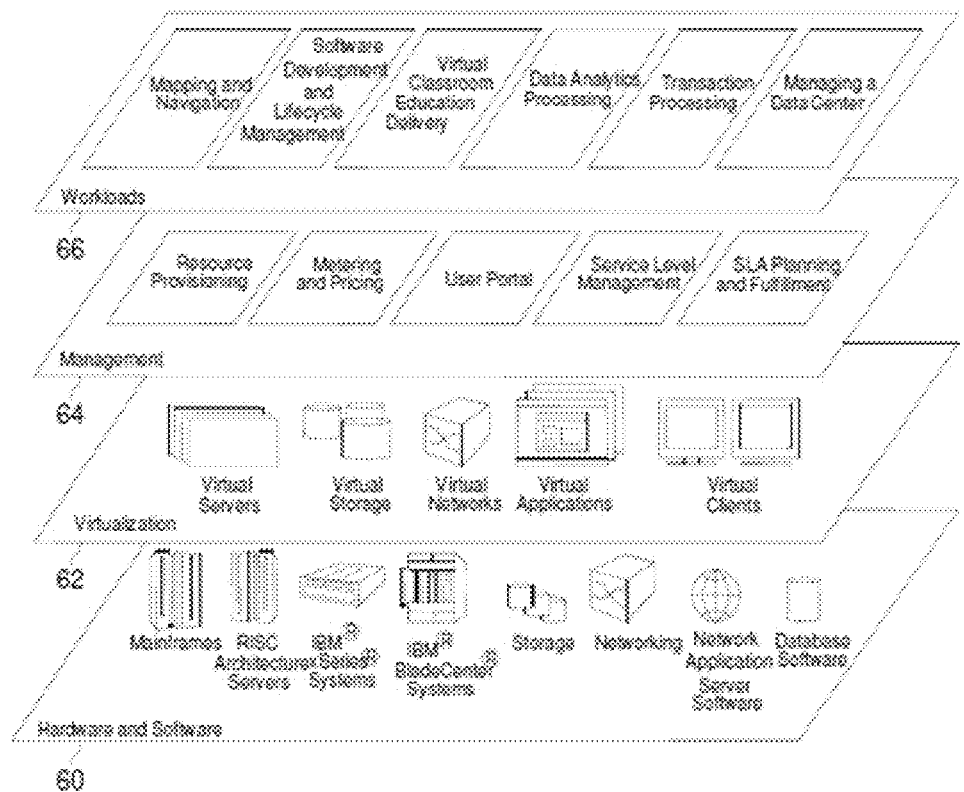
FIG. 1C depicts abstraction model layers according to embodiments.

Referring now to FIG. 1C, a set of functional abstraction layers provided by cloud computing environment 50 (FIG. 1B) is shown. It should be understood in advance that the components, layers, and functions shown in FIG. 1C are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing a data center. Aspects of managing the data center may provide job configuration choices to the users that allow for green, environmentally-friendly computing by allowing them users to specify their preferences for running their jobs during periods of the day when renewable energy resources such as wind and solar energy are available. Aspects of managing the data center may provide incentives in the form of positive impacts to incurred charge-back costs of users to encourage users to choose energy-aware time management of their jobs.

Figure 2:
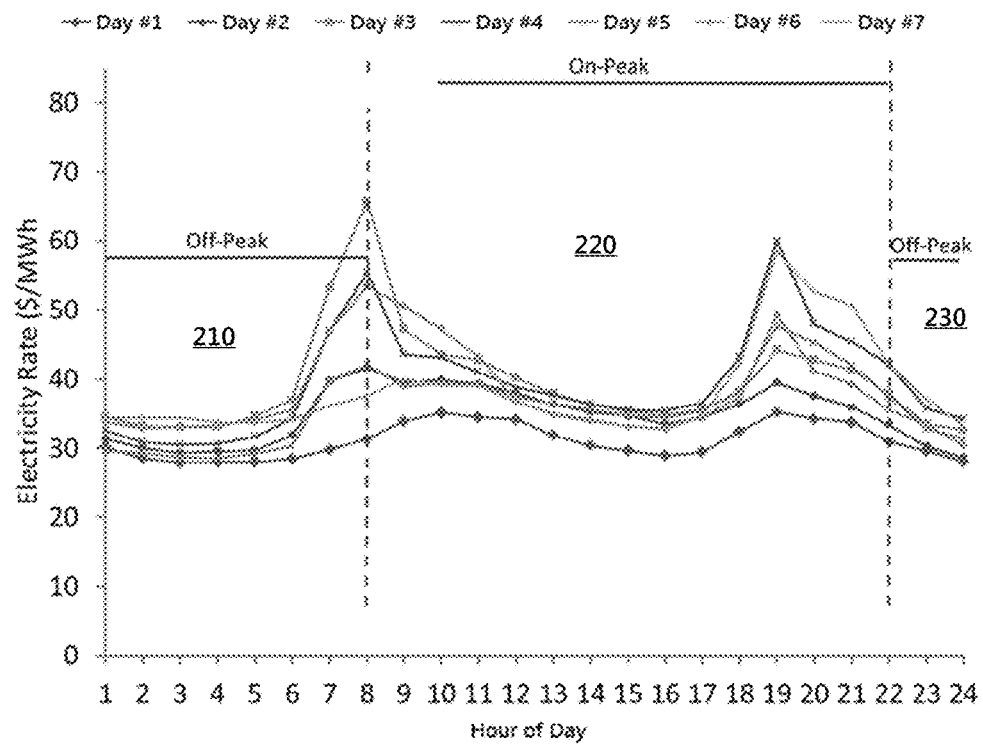
FIG. 2 shows hourly electricity rates over a seven-day time span according to embodiments.

FIG. 2 shows hourly electricity rates over a seven-day time span according to embodiments. Wholesale electricity prices can be lower than retail prices for a significant portion of hours in a day (e.g., upwards of eighty or ninety percent of hours). Sections 210 and 230 show the difference between an off-peak rate and an actual rate for individual hours on individual days. Similarly, section 220 shows the difference between an on-peak rate and an actual rate for individual hours on individual days. To illustrate in the context of the disclosure, consider the example where a low priority job is submitted at 8 A.M. This job will need to be delayed by at-least 12 hours if it were to avail low off-peak prices, which is possible only if the job has a flexible temporal target. Without a flexible temporal target, the job will need to be scheduled during the on-peak periods to ensure that its temporal target is not exceeded. Thus the opportunities for scheduling the jobs at low cost periods without exceeding their deadlines can be rather limited with a coarse-grained scheduler. On the other hand, day-ahead wholesale prices can provide more price variations within a day and across days compared to fixed contractual prices or diurnal retail prices. The wholesale day-ahead prices are low sometimes even during the on-peak hours in certain locations. For instance, in a warm week during the winter in a given location (e.g., northern California), prices may be low between the hours of 12:00 A.M. and 6 P.M. in addition to the off-peak hours. Similarly, in late summer, prices may be lower than off-peak rates between the hours of 8 A.M.-10 A.M. and lower than on-peak rates until 12 P.M.

Figure 3:
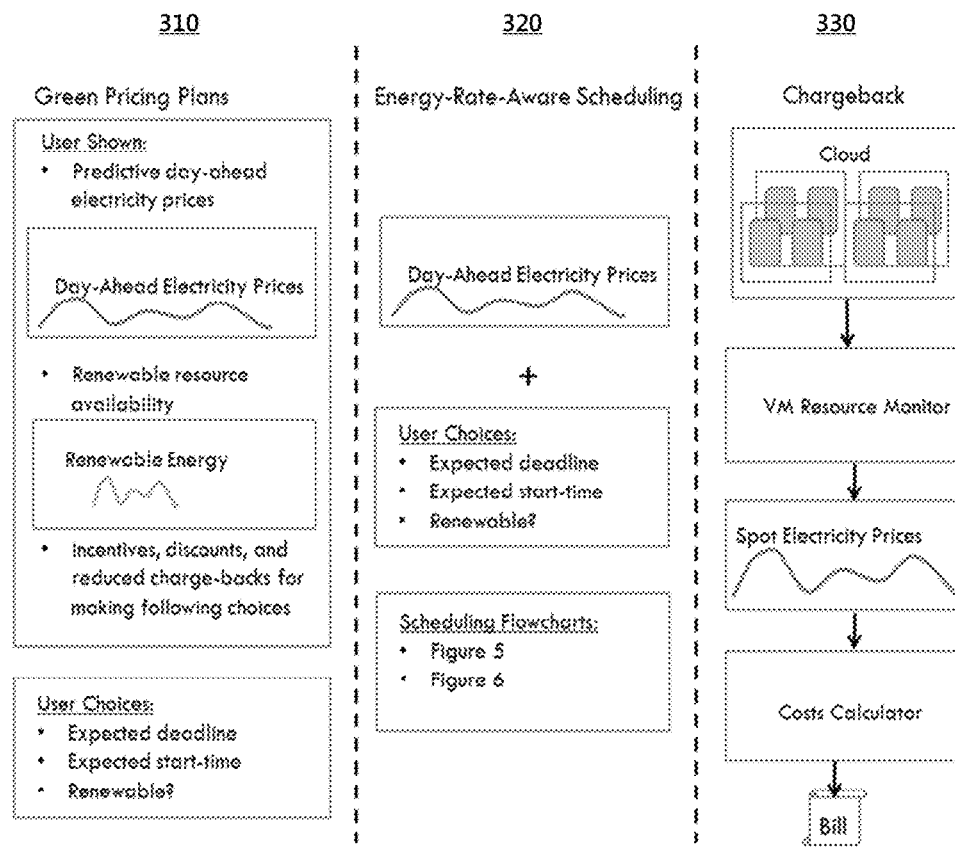
FIG. 3 depicts a diagram showing an arrangement for a pricing plan, a scheduling method, and a charge-back model according to embodiments.

FIG. 3 depicts a diagram showing an arrangement for a pricing plan, a scheduling method, and a chargeback model according to embodiments. Section 310 outlines a possible pricing plan which is a green pricing plan according to embodiments. As an example of what may be shown to a user, the green pricing plan includes predictive day-ahead electricity prices, renewable resource availability and incentives, discounts, and reduced charge-backs for making choices related to expected deadline, expected start-time, or renewable features. Section 320 outlines a possible scheduling method which is an energy-rate-aware scheduling method according to embodiments. The scheduling method may include use of day-ahead electricity prices and choices related to expected deadline, expected start-time, or renewable features (aspects related to the scheduling method may include those described in relation to FIGS. 5-6). Section 330 outlines a possible chargeback model according to embodiments. The chargeback model includes interface with the cloud, a machine resource monitor, spot electricity prices, a costs calculator, and delivery of a bill. Embodiments to manage a data center are not limited to the arrangement described and other configurations are considered for a method or system (e.g., implemented with modules).

Figure 4:
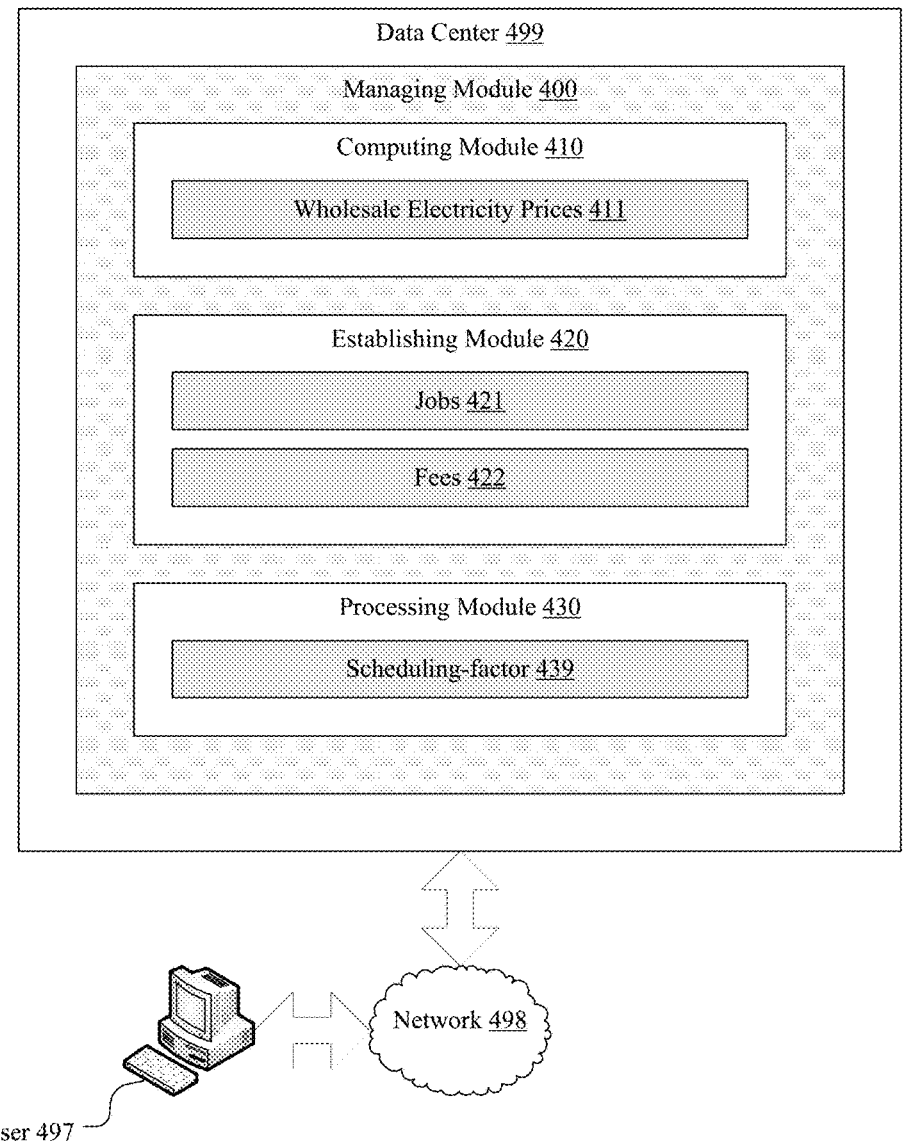
FIG. 4 shows modules of a system for managing a data center according to embodiments.

FIG. 4 shows modules of a system for managing a data center 499 according to embodiments. In embodiments, a method (e.g., method 500 of FIG. 5, method 600 of FIG. 6) for managing the data center 499 may be implemented using one or more modules of FIG. 4. These modules may be implemented in hardware, software or firmware executable on hardware, or a combination thereof. The data center 499 may have a connection with a network 498 and a user 497. For example, module functionality that may occur in the data center 499 may actually be implemented over the network 498. Other functionality may be distributed across the data center 499 and the network 498.

The data center 499 may include a managing module 400. The managing module 400 may be configured and arranged to manage the data center 499. The managing module 400 may include a computing module 410, an establishing module 420, and a processing module 430. The computing module 410 may include a wholesale electricity prices feature 411. The establishing module 420 may include a jobs feature 421 and a fees feature 422. The processing module 430 may include a scheduling-factor feature 439.

The computing module 410 may compute an energy cost estimate (price to perform operations) for operating the data center based on available energy rates (e.g., wholesale electricity prices). The computing module 410 may ascertain (determine, find out) wholesale electricity prices for the data center as a wholesale electricity prices feature 411. The day-ahead wholesale hourly wholesale electricity rates may be made available prior to the start of the day. The module 410 may proactively get the hourly day-ahead wholesale prices (e.g., related to a wholesale energy/electricity market) from a Regional Transmission Operator or an Independent System Operator. The day-ahead wholesale electricity rates can exhibit significant hourly temporal variations. The wholesale electricity prices can include a first wholesale electricity price for a first period of time (e.g., five minutes, fifteen minutes, thirty minutes, sixty minutes) of a first hour (a consecutive sixty minutes) and a second wholesale electricity price for a second period of time of a second hour. The first wholesale electricity price is different from the second wholesale electricity price. In embodiments, an amount of electricity used by each job running on the data center may be measured by the computing module 410. The data center may receive a number of jobs as part of the computing module 410.

The processing module 430 processes, during the first period of time, at least a first portion of a first job of the jobs feature 421. The first portion of the first job may be selected for processing based on a first scheduling-factor of the scheduling-factor feature 439. The first scheduling-factor can be related to at least the first portion of the first job. The first scheduling-factor may include a temporal rating (e.g, a ranking for completion time or deadline), a duration rating (e.g., a classification for job-length), an environmental rating (e.g., a grade for wind or solar energy friendliness), a cost rating (e.g., a scoring system for fees or prices), or a priority rating (e.g., a categorization based on comparing jobs).

In embodiments, at least a second portion of a second job of the jobs feature 421 may be processed during the second period of time. The second portion of the second job can be selected for processing based on a second scheduling-factor of the scheduling-factor feature 439. The second scheduling-factor can be related to at least the second portion of the second job. In embodiments, the first scheduling-factor may be greater (e.g., longer in time, cost more, more environmentally friendly) than the second scheduling-factor. In embodiments, the first period of time precedes the second period of time. In embodiments, the first period of time is longer than the second period of time (e.g., thirty minutes versus fifteen minutes). In embodiments, the first electricity price is greater than the second electricity price.

In embodiments, a third wholesale electricity price may be computed or ascertained for the data center by the computing module 410 for a third period of time of a third hour. The third wholesale electricity price may be different from the first and second wholesale electricity prices. At least a third portion of a third job of the jobs feature 421 may be processed during the third period of time. The third portion of the third job may be selected for processing based on a third scheduling-factor of the scheduling-factor feature 439. The third scheduling-factor can be related to at least the third portion of the third job.

The first portion of the first job may have a first temporal target. In embodiments, the first temporal target can be a user defined moment in time by which the first portion of the first job is requested to be completed or a deadline. The first temporal target may be after the first and second periods of time. The establishing module 420 establishes a first fee of the fees feature 422 for at least beginning processing of at least the first portion of the first job before the first temporal target. The first fee may be based at least in part on at least one of the first and second wholesale electricity prices (e.g., the lesser of the prices). Establishing the first fee may be done in response to receiving at least the first portion of the first job. A computer may be used to establish the fees. The fees may be established via implementation as instruction code executed on a processor device.

In embodiments, the second portion of the second job may have a second temporal target. The second temporal target may be after the first period of time and before the second period of time. Embodiments may include establishing a second fee of the fees feature 422 for at least beginning processing of at least the second portion of the second job before the second temporal target. The second fee may be greater than the first fee. The second fee may be based at least in part on at least one of the first and second wholesale electricity prices (e.g, the greater of the prices).

In embodiments, the third portion of the third job may have a third temporal target. The third temporal target may be before the first and second periods of time. Embodiments may include establishing a third fee of the fees feature 422 for at least beginning processing of at least the third portion of the third job before the third temporal target. The third fee may be greater than the second fee (e.g., greater than both the first and second fees). The third fee may be applicable in cases where the job is requested to be done with a significantly high priority (e.g., no later than the end of the day the job is received).

In embodiments, the computing module 410 can ascertain renewable resource rates (e.g., a rate for green energy resources such as wind or solar) for the data center. A first renewable resource rate for the first period of time of the first hour and a second renewable resource rate for the second period of time of the second hour may be computed or ascertained. The first renewable resource rate can be different from the second renewable resource rate. The fees, including the first fee, can be established based at least in part on at least one of the first and second renewable resource rates. In embodiments, the fees may be calculated using one or more of the wholesale electricity prices and an actual resource utilization of a machine (e.g., virtual machine) running on behalf of a user for one or more of the periods of time. A particular fee may be less than a retail fee (e.g., a retail electricity price for a particular period of time) for at least beginning processing of a specific job before a specific temporal target.

For example, after making cloud configuration choices, a user may be presented with an option to select a different start-time for their jobs (default being the current time). For this, the user may be shown the temporal variations in day-ahead wholesale electricity prices for the current day. To determine the possible incentives for selecting an energy-efficient start-time, the users can be asked to use a charge-back estimator. The charge-back estimator can allow a user to select a desirable start-time and input expected characteristics of the jobs such as run-time, number of parallel tasks (which gives an estimation of the number of servers on which the job will need to run), and expected resource utilization of a task.

The charge-back estimator can then perform a ball-park calculation of the possible cloud usage costs reduction the user may enjoy for the start-time value chosen in the simulation run, by using the user inputs in the chargeback model. If the user finds the incentive of reducing their usage costs attractive, they can then specify the chosen start-time in the job configuration. If the data center of the cloud provider also has renewable energy sources, the pricing plan allows the user to choose a start-time which coincides with high availability of renewable energy. This option may appeal to particularly environmentally conscious people.

The pricing plan may then offer the user a choice of being flexible in their expected job completion deadline even without specifying a start-time. Flexibility in a deadline may be based on a combination of factors including the estimated job duration, the expected/tolerable job completion deadline, or the time remaining to complete the job. A job with significant flexibility allows the system to delay the job execution to a time with lowest electricity rate. In embodiments, the job can also get interrupted when the price becomes high in a specific period of time and can be restarted from the interruption point at a lower price period of time without exceeding the deadline.

The user may be given a discount as an incentive for flexibility in their deadline. The incentive can be determined based on the potential savings in the demand charges and cooling costs (cooling systems may otherwise be provisioned for using the peak utilization) which are made possible by using wholesale electricity prices which can permit load shifting to different periods of time thereby resulting in reduced peak utilization.

One way for the user to see the effects is via the charge-back they are charged for using the cloud. A lower charge-back provides an incentive to the user to make energy-aware choices which allows the system to make better and more energy-cost-efficient scheduling decisions. A coarse-grained chargeback model based on resource allocation, peak power consumption, entire duration of time the cloud instance is configured, and fixed electricity rates may fail to show a reduction in the usage costs. However, a fine-grained, utilization-driven, and wholesale-spot-price-aware charge-back model may provide the benefits discussed herein.

The charge-back may include two components. First, a fixed cost which covers the share of the capital costs (costs of servers, networking equipment, cooling and power infrastructure, personnel, maintenance). And second, a variable cost that depends on the resource instances configured, the per-interval utilization of the resources, and the per-interval electricity price. The major contributor to variable cost may be the energy cost which includes two parts. A static energy cost and a dynamic energy cost which is based on the actual utilization of the resources.

The utilization of the resources (e.g., central processing unit, memory, disks, network) may be monitored for each individual machine (e.g. virtual machine) running on the behalf of the user at the time granularity (e.g., five minute, fifteen minute, one hour) of the spot wholesale electricity prices. Resource monitoring tools may be embedded in cloud management software for monitoring the resource utilization of the individual machines running on the physical server which can be leveraged to capture the resource utilization at periods of time. Aspects of the disclosure may be used at a data center in a single location. Reliance upon energy prices that differ geographically may be avoided. The presence of renewable energy sources may positively impact the implementation of aspects of the disclosure.

Figure 5:
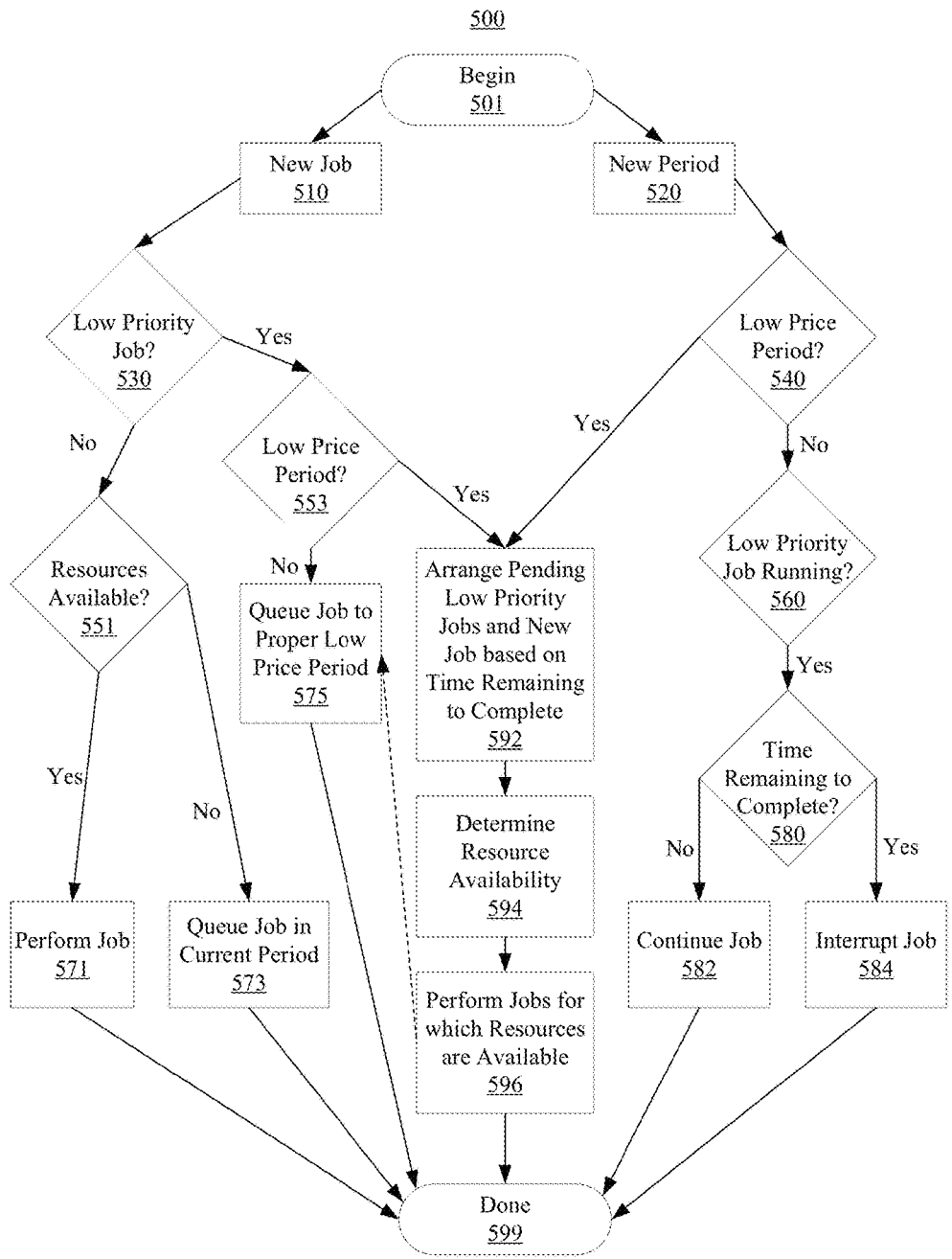
FIG. 5 is a flowchart illustrating a method for managing a data center according to embodiments.

FIG. 5 is a flowchart illustrating a method 500 for managing a data center according to embodiments. The method 500 may begin at block 501 with a new job 510 or a new period of time 520 having queued jobs already existing. In embodiments, the method may be a scheduling method to positively impact energy costs using an awareness of fine-grained, hourly variations in day-ahead wholesale electricity prices. The scheduling method may reduce energy costs while maintaining that high priority jobs are not delayed (e.g., due to operations of the scheduling method), the start-time of low priority jobs is not be delayed more than a "look-ahead window" of hours or a desired start-time (if specified) by a user, and a run-time of low priority jobs does not exceed their specified deadline tolerance.

A job (e.g., new job 510) may be defined as a high priority job (and given a high priority rating) if the user chooses to not leverage the start-time or the flexible (lax) deadline options in a pricing plan. A job may be defined as low priority (and given a low priority rating) if the user specifies a delayed start-time or a flexible completion deadline. In embodiments, a quantity of high priority jobs may be significantly less compared to a quantity of low priority jobs (e.g., one-hundred times less). Several classes of jobs can be assigned flexible deadlines or delayed start-times by the users to avail green computing or reduced usage costs. Some examples of such classes of jobs include: optional but desirable simulation runs to increase confidence level of an experimenter, video encoding/compression/trans-coding, complex model generation, genomics analytics, long running drug testing/analysis/design, geo-spatial/physics simulations, off-line predictive analytics and model generation (e.g., for website analytics, trend analytics, and user behavior desires profiling), scalable application test-bed and for doing more testing runs for thorough quality assurance, and document conversion. Such jobs may typically be long-running and hence, can result in high usage costs. Submitters of such jobs can take advantage of the lower usage costs incentive provided by using a pricing plan that assigns a delayed start-time or flexible deadline to their jobs. This may help the scheduling method delay, stagger, or interrupt and restart such jobs to reduce energy costs, demand charges, and charge-backs.

In embodiments, the scheduling method may utilize the wholesale, day-ahead, hourly electricity rates, renewable energy available times (if applicable), and the start-time and deadline options selected by the users in its decision making process. The hours in the day may be sorted in order based on their day-ahead prices. The method 500 may begin at block 501 when a new job 510 is submitted or at the new period of time 520 (e.g., every hour) and as illustrated in the FIG. 5. If the new job 510 is determined to be high priority (i.e., not low priority) at block 530, it is submitted to be performed irrespective of a price point of a current period of time. If, at block 551, resources are available to perform the new job, it may be performed at block 571. If, at block 551, resources are not available, the new job may be queued at block 573.

If the current period of time is a "low-price" period at block 553 (for a new job 510) or block 540 (for a new period of time 520), the queued jobs and the incoming low priority job may be arranged (ordered) based on their expected deadlines at block 592. The jobs with shortest time left to deadline are selected for execution at block 596 based on availability of resources as determined at block 594. The remaining jobs remain queued for later execution for the next "low-price" interval at block 575.

If the current period of time is a "high-price" period as determined block 540, the low priority jobs running at block 560 whose deadlines have not expired (or will not expire prior to the end of the next "low-price" period) as at block 580 can be interrupted at block 584 and so that they can be resumed in the next "low-price" period. Such jobs who are at or beyond their deadlines may continue for processing at block 582. In embodiments, scaling-down servers and machines (e.g., virtual machines) during periods of low load by consolidating load on few servers may lead to higher energy costs savings and allow for energy-proportionality. The method 500 may conclude at block 599. The methodology may provide the fine-grained scheduling method with more options for intermittent, low-price times in scheduling low priority jobs with shorter deadlines and run-times. The methodology may allow for a better staggering of jobs across the day, resulting in lower peak demands, and thereby, lower demand charges.

Figure 6:
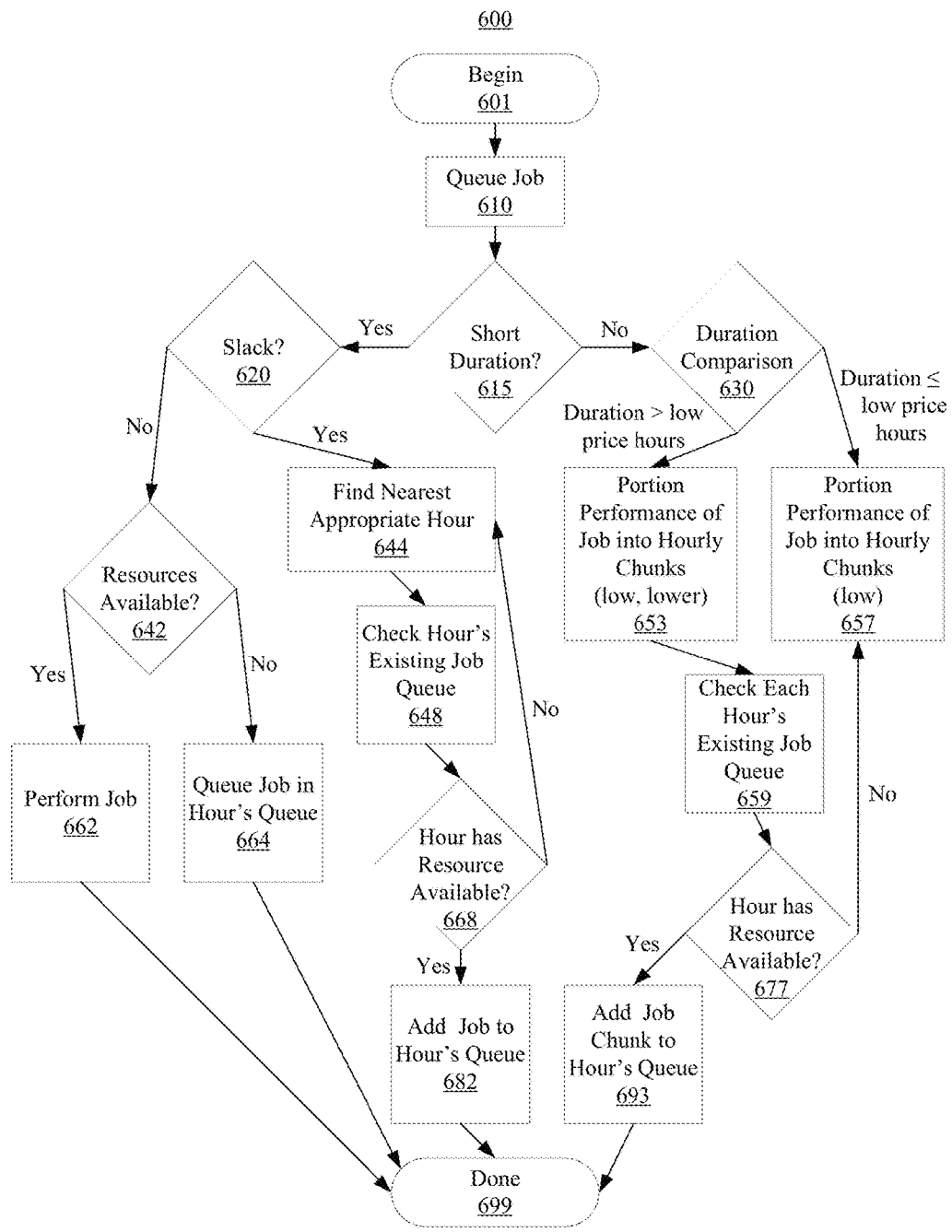
FIG. 6 is a flowchart illustrating a method for managing a data center according to embodiments.

FIG. 6 is a flowchart illustrating a method for managing a data center according to embodiments. The method 600 may begin at block 601. A job may be queued by a scheduling method for later execution at block 610. This may occur if, for example, a job is determined to be low priority and either the current time interval is not designated as a "low-price" one, or the specified start-time is later than the current time, or if not there are not enough resources available to run the job. The scheduling method may maintain a separate wait queue for each hour in the day, and a number of next days. In absence of an explicit user identified start-time, the scheduling method may compute the latest start-time of the low priority job at which the job can be started without exceeding its deadline tolerance and a safety margin specified by the scheduling method (e.g., the sum of the start-time, the execution time, and the safety margin is less than the specified deadline). The job may be queued to the hour computed by the scheduling method provided that the combined resource utilization of the previously queued jobs at that hour allows the new job to execute in the same hour without running into resource constraints.

It may be determined whether the job has a short duration at block 615. In embodiments, low priority jobs may tend to have a short duration relative to high priority jobs. If the incoming job (e.g., low priority job) has a long duration (i.e., not a short duration), the job is broken into job chunks and each job chunk is queued to the low price hours across the day in such a way that the total running time of the job doesn't exceed its deadline. A duration comparison may occur at block 630. If the long duration is less than or equal to an amount of low-price hours, performance of the job may be portioned into low-price hourly chunks at block 657. If the long duration is greater than an amount of low-price hours, performance of the job may be portioned into hourly chunks across low-price hours and lower-priced hours at block 653. In portioning subsequent to block 653, an existing job queue for hour may be checked at block 659. If the checked hour has available resources at block 677, an associated job chunk may be added to the existing job queue at block 693. If the checked hour does not have available resources at block 677, the scheduling method may return to block 657.

If the incoming job has a short duration, it may be determined whether slack (e.g., a significant amount of time until a temporal target) exists at block 620. If slack does not exist, it may be determined whether resources are available to perform the job at block 642. If resources are available, the job may be performed at block 662. If resources are not available, the job may be queued to be performed during the current period of time (e.g., performed later during the current hour). If slack does exist, a nearby (e.g., nearest) appropriate period of time may be found at block 644. The existing job queue for the nearby appropriate period of time may be checked for availability at block 648. If the nearby appropriate period of time has resources available, the job may be added to the existing job queue for the nearby appropriate period of time at block 682. If the nearby appropriate period of time fails to have resources available, another hour may be found using operations at block 644. The method 600 may conclude at block 699.

Aspects of the disclosure may include a method for scheduling incoming jobs in an energy price aware manner. At the start of a new day, day-ahead hourly wholesale electricity prices of a regional electricity provider may be determined. Hours may be arranged in high and low price buckets. Whether a user has specified an expected deadline and priority of an incoming job may be determined. High priority jobs may be scheduled as soon as they are submitted (if the user does not set a priority, the job may be considered a high priority job). Certain jobs may be queued and scheduled during periods of time of low electricity price (factors such as the service level agreement may be considered and methodologies such as performing jobs with the shortest deadline slack time first may be used). If the user is flexible regarding the job completion time and is interested in saving money, predictions may be leveraged for coming days from historical prices. Such predictions may be used to schedule jobs on days/times with lower prices.

Aspects of the disclosure may include a method of developing an energy aware pricing model. The energy aware pricing model may provide price incentives to users so that they are more willing to submit jobs with accurate deadline tolerance and priorities. The energy aware pricing model may factor-in electricity costs savings that would be possible if a dynamic electricity price aware scheduling method is used for the deadline with a priority specified by the user for a job. At the time of job submission, the pricing model may be utilized to determine the price to quote user based on user inputs. A user who is willing to extend the anticipated deadline tolerance can be quoted a lower cost for using compute time on a cluster. A user with a slightly flexible deadline can be quoted medium cost for compute time. A user with stringent deadlines can be quoted higher cost for compute time. A user who opts not to specify deadlines/priority can be quoted a higher cost for compute time.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages. The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

While the foregoing is directed to exemplary embodiments, other and further embodiments of the disclosure may be devised without departing from the basic scope thereof, and the scope thereof is determined by the claims that follow.

What is claimed is:

1. A computer-implemented method for scheduling computing jobs in a cloud computing system to improve resource utilization and energy consumption, wherein the cloud computing system comprises at least one provider computer, and wherein the method comprises:

receiving, by the at least one provider computer, from a requester computer communicatively coupled to the at least one cloud services provider computer, a request to execute, by the at least one provider computer, a first computing job, the at least one provider corresponding to a first compute node of a network of interconnecting compute nodes in the cloud computing system that share resources, the at least one provider computer including a virtualization layer that includes: one or more virtual servers, virtual storage, one or more virtual networks, and one or more virtual applications;

computing, by the at least one provider computer, in response to the request, a job execution plan comprising a plurality of job execution time periods, the plurality of job execution time periods specifying a quantity of hours or minutes, wherein each of the plurality of job execution time periods is associated with a respective user fee for the at least one provider computer to execute at least a portion of the first computing job during the associated job execution time period, each of the respective user fee for use in helping to reduce energy consumption within the cloud computing system by incentivizing users to execute a particular job during a time at which energy consumption is low, wherein each of the respective user fees is based, at least in part, on a wholesale electricity price, among a set of wholesale electricity prices, and wherein the set of wholesale electricity prices comprises more price granularity than an on-peak price and an off-peak price;

computing, by the at least one provider computer, an environmental rating associated with a first execution time period, among the job execution time periods included in the job execution plan, the first execution time period specifying a quantity of hours or minutes, wherein the at least one provider computer computes the environmental rating based, at least in part, on the at least one provider computer determining an availability to the at least one provider computer, during the first execution time period, of electrical energy provided by a renewable energy resource;

communicating, by the at least one provider computer, to the requester computer, the job execution plan, wherein the environmental rating is included in the job execution plan in association with the first execution time period;

receiving, by the at least one provider computer, from the requester computer, in response to the communicating the job execution plan, user-specified job scheduling-factors, associated with the at least one provider computer executing the first computing job, wherein the user-specified-job scheduling-factors are based, at least in part, on the job execution plan, and wherein the user-specified job scheduling-factors include an environmental scheduling-factor based, at least in part, on the environmental rating associated with the first execution time period, the scheduling-factors for use in helping to improve resource utilization by at least reducing central processing unit and memory utilization of a first set of virtual servers of the cloud computing system;

computing, by the at least one provider computer, based at least in part on at least one of the user-specified job scheduling-factors and a categorization of the first computing job, a job execution priority associated with the first computing job; and executing, by the at least one provider computer, at least a first portion of the first computing job during the first execution time period, based on the job execution priority in combination with the environmental scheduling-factor, the executing of the at least a first portion of the first computing job causing a reduction in energy consumption within the cloud computing system, the executing of the at least a first portion further causing the improvement of the resource utilization.

2. The method of claim 1, wherein the environmental rating comprises at least one of a grade for wind friendliness, a grade for solar energy friendliness, a price for wind energy, a price for solar energy, and a price of corn used for ethanol.

3. The method of claim 1, wherein the user fee corresponding to the first execution time period is based on a wholesale electricity price corresponding to the renewable energy resource, and wherein the wholesale electricity price corresponding to the renewable energy resource changes over time.

4. The method of claim 1, wherein the method further comprises executing, by the at least one provider computer at least a second portion of the first computing job during at least one second execution time period, based, at least in part, on the job execution priority in combination with the job execution plan and the user-specified scheduling-factors.

5. A computer program product for scheduling computing jobs in a cloud computing system, wherein the cloud computing system comprises at least one provider computer, the computer program product comprising a non-transitory computer readable storage medium having program code embodied therewith, the program code executable by the at least one provider computer, among the at least one provider computer, to cause the at least one provider computer to:

receive from a requester computer a request to execute, by the at least one provider computer a first computing job;

compute, in response to the request, a job execution plan comprising a plurality of job execution time periods, wherein each of the plurality of job execution time periods is associated with a respective user fee for the at least one provider computer to execute at least a portion of the first computing job during the associated time period, wherein each of the respective user fees is based, at least in part, on a wholesale electricity price among a set of wholesale electricity prices, and wherein the set of wholesale electricity prices comprises more price granularity than an on-peak price and an off-peak price;

determine an availability, to the at least one provider computer during a first execution time period, among the job execution time periods included in the job execution plan, of electrical energy provided by a renewable energy resource;

compute an environmental rating, associated with the first execution time period, based, at least in part, on the availability of the electrical energy provided by a renewable energy resource;

communicate to the requester computer, the job execution pricing plan, including the environmental rating in the job execution plan in association with the first execution time period;

receive, from the requester computer, in response to the communicating the job execution plan, user-specified job scheduling-factors associated with the at least one provider computer executing the first computing job, wherein the user-specified job scheduling-factors are based, at least in part, on the job execution plan, and wherein the user-specified job scheduling-factors include an environmental scheduling-factor based, at least in part, on the environmental rating associated with the first execution time period;

compute, based at least in part on the user-specified job scheduling factors and a categorization of the first computing job, a job execution priority associated with the first computing job; and execute at least a first portion of the first computing job during the first execution time period, based, at least in part, on the job execution priority in combination with the environmental scheduling-factor.

6. The computer program product of claim 5, wherein the job execution plan includes at least one of incentives, discounts, and reduced charge-backs, and wherein the reduced charge-backs are based at least in part on the user-specified job scheduling factors including at least one of an expected deadline, an expected start-time, and renewable features.

7. The computer program product of claim 5, wherein the program code is executable by the at least one provider computer to further cause the at least one provider computer to:

interrupt the executing the at least a first portion of the first computing job; and resume executing the at least a first portion of the first computing job by the at least one provider computer at a next low-price period, the next low-price period corresponding to a second execution time period, among the plurality of job execution time periods, in which a wholesale electricity price corresponding to the second execution time period is lower than a wholesale electricity price corresponding to a third execution time period among the plurality of job execution time periods.

8. The computer program product of claim 5, the user fee corresponding to the first execution time period is based on a wholesale electricity price corresponding to renewable energy resource, and wherein the wholesale electricity price corresponding to the renewable energy resource changes over time.

9. The computer program product of claim 5, wherein the program code is executable by the at least one provider computer to further cause the at least one provider computer to execute at least a second portion of the first computing job during at least one second execution time period, based, at least in part, on the job execution priority in combination with the job execution plan and the user-specified scheduling-factors.

10. The method of claim 1, wherein the method further comprises:
executing, by the at least one cloud computing node, the at least a first portion of the first job during the at least one first execution time;
interrupting, by the cloud computing system, the executing the at least a first portion of the first computing job by the at least one provider computer; and
resuming, by the at least one provider computer executing the at least a first portion of the first computing job by the at least one provider computer at a next low-price period, the next low-price period corresponding to a second execution time period, among the plurality of job execution time periods, in which a wholesale electricity price corresponding to the second execution time period is lower than a wholesale electricity price corresponding to a third execution time period among the plurality of job execution time periods.

11. The method of claim 1, wherein the job execution priority comprises a high priority and a low priority.

12. The method of claim 11, wherein the first computing job has the high priority, and wherein the executing the at least a first portion of the first computing job comprises executing the at least a first portion of the first computing job as soon as a provider computer, among the at least one provider computer, is available.

13. The method of claim 11, wherein the first computing job has the low priority, and wherein the first execution period comprises a time period, among the plurality of job execution time periods, in which a wholesale electricity price corresponding to the first execution time period is lower than a wholesale electricity price corresponding to a second execution time period among the plurality of job execution time periods.

14. The method of claim 1, wherein the user-specified scheduling-factors comprise one of a flexible start time and a delayed start time.

15. The computer program product of claim 5, wherein the job execution priority comprises a high priority and a low priority.

16. The computer program product of claim 15, wherein the first computing job has the high priority, and wherein the executing the at least a first portion of the first computing job comprises executing the first job as soon as a provider computer, among the at least one provider computer, is available.

17. The computer program product of claim 15, wherein the first computing job has the low priority, and wherein the first execution period comprises a time period, among the plurality of job execution time periods, in which a wholesale electricity price corresponding to the first execution time period is lower than a wholesale electricity price corresponding to a second execution time period among the plurality of job execution time periods.

18. The computer program product of claim 5, wherein the user-specified scheduling-factors comprise one of a flexible start time and a delayed start time.

* * * * *